United States Patent
Killebrew, Jr. et al.

[11] Patent Number: 6,034,663
[45] Date of Patent: Mar. 7, 2000

[54] METHOD FOR PROVIDING GREY SCALE IMAGES TO THE VISIBLE LIMIT ON LIQUID CRYSTAL DISPLAYS

[75] Inventors: Carrell R. Killebrew, Jr., Saratoga; Jian Lin, San Jose; Shih-hua Chang, Sunnyvale, all of Calif.

[73] Assignee: Chips & Technologies, LLC, San Jose, Calif.

[21] Appl. No.: 08/814,569

[22] Filed: Mar. 10, 1997

[51] Int. Cl.$^7$ .................................................. G09G 5/10
[52] U.S. Cl. ........................ 345/147; 345/149; 345/152; 345/127
[58] Field of Search .................... 345/138, 147, 345/127, 149, 1.5, 152, 89, 137; 315/169.4

[56] References Cited

U.S. PATENT DOCUMENTS

| | | | |
|---|---|---|---|
| 3,735,182 | 5/1973 | Dalton et al. | 313/188 |
| 3,845,243 | 10/1974 | Schmersal et al. | 178/7.3 D |
| 3,937,878 | 2/1976 | Judice | 345/147 |
| 3,967,052 | 6/1976 | Judice | 348/798 |
| 4,021,607 | 5/1977 | Amano | 358/230 |
| 4,074,254 | 2/1978 | Belser et al. | 340/324 |
| 4,100,579 | 7/1978 | Ernstoff | 358/230 |
| 4,180,813 | 12/1979 | Yoneda | 340/784 |
| 4,193,095 | 3/1980 | Mizushima | 358/241 |
| 4,385,293 | 5/1983 | Wisnieff | 340/793 |
| 4,427,978 | 1/1984 | Williams | 340/784 |
| 4,480,460 | 11/1984 | Bernot et al. | 350/333 |
| 4,486,785 | 12/1984 | Lasher et al. | 358/284 |
| 4,591,848 | 5/1986 | Morozumi et al. | 340/784 |
| 4,640,582 | 2/1987 | Oguchi et al. | 350/333 |
| 4,644,495 | 2/1987 | Crane | 364/900 |
| 4,648,050 | 3/1987 | Yamagami | 364/526 |
| 4,654,721 | 3/1987 | Goertzel et al. | 358/283 |
| 4,660,030 | 4/1987 | Maezawa | 340/784 |
| 4,688,031 | 8/1987 | Haggerty | 340/793 |
| 4,695,884 | 9/1987 | Anastassiou et al. | 358/163 |
| 4,706,077 | 11/1987 | Roberts et al. | 340/728 |
| 4,709,995 | 12/1987 | Kuribayashi et al. | 350/350 |
| 4,742,346 | 5/1988 | Gillette et al. | 340/793 |
| 4,743,096 | 5/1988 | Wakai et al. | 350/333 |
| 4,769,713 | 9/1988 | Yasui et al. | 358/236 |
| 4,775,891 | 10/1988 | Aoki et al. | 358/160 |
| 4,779,083 | 10/1988 | Ishii et al. | 340/767 |
| 4,791,417 | 12/1988 | Bobak | 340/784 |
| 4,805,994 | 2/1989 | Miyajima | 350/336 |
| 4,827,255 | 5/1989 | Ishii | 340/793 |
| 4,860,246 | 8/1989 | Inoue | 364/900 |
| 4,872,059 | 10/1989 | Shinabe | 358/241 |
| 4,908,613 | 3/1990 | Green | 340/719 |
| 4,921,334 | 5/1990 | Akodes | 350/333 |
| 4,929,058 | 5/1990 | Numao | 350/333 |
| 4,956,638 | 9/1990 | Larky et al. | 340/701 |

(List continued on next page.)

FOREIGN PATENT DOCUMENTS 2204174A  11/1988  United Kingdom ............. G09G 3/36

*Primary Examiner*—Dennis-Doon Chow
*Assistant Examiner*—Amr Awad
*Attorney, Agent, or Firm*—D'Alessandro & Ritchie

[57] ABSTRACT

A method for displaying grey-scale images at a desired grey scale resolution on a display having a matrix of pixels, comprises the steps of: defining a control matrix having a size smaller than the entire display and equal to the desired grey scale resolution of the display, each position in the control matrix having an address assigned such that unintended artifacts in the display are controlled; horizontally and vertically mapping the control matrix into the display such that each pixel in the matrix of pixels in the display corresponds to an address in a control matrix mapped into the display; comparing control matrix address of each pixel in a frame of an image to be displayed on the display to a range of address values and turning that pixel on if the grey scale value of that pixel is within the range of address values, the range of address values arranged in a circular queue and being equal to the grey scale value of that pixel; and shifting the range of address values in the circular queue for successive frame by an amount equal to the grey scale value of the pixel to be displayed.

23 Claims, 10 Drawing Sheets

U.S. PATENT DOCUMENTS

| | | | |
|---|---|---|---|
| 5,053,764 | 10/1991 | Barbier et al. | 340/793 |
| 5,068,649 | 11/1991 | Garrett | 340/793 |
| 5,075,683 | 12/1991 | Ghis | 340/793 |
| 5,185,602 | 2/1993 | Bassetti, Jr. et al. | 340/793 |
| 5,245,328 | 9/1993 | Garrett | 345/149 |
| 5,252,959 | 10/1993 | Kono | 345/147 |
| 5,337,408 | 8/1994 | Fung et al. | 395/162 |
| 5,400,044 | 3/1995 | Thomas | 345/147 |
| 5,543,819 | 8/1996 | Farwell et al. | 345/150 |

Matrix 1

Matrix 2

METHOD FOR PROVIDING GREY SCALE IMAGES TO THE VISIBLE LIMIT ON LIQUID CRYSTAL DISPLAYS

BACKGROUND OF THE INVENTION

1. Field of the Invention

The present invention relates to computer displays and to liquid crystal computer displays. More particularly, the present invention relates to methods for providing grey scale up to the visible limit for display on liquid crystal displays.

2. The Prior Art

Numerous methods are known for producing grey-scale images on digital (i.e., on/off) displays with characteristics similar to super-twisted nematic (STN) liquid crystal displays (LCD). Modulating individual pixels by employing frame-rate-control (FRC) algorithms over time and by spatial dithering appear to be the preferred methods for realizing gray scale on displays with STN LCD and similar characteristics.

Prior-art methods producing such grey-scale images do not claim gray scale approaching the visible limit, but are usually limited to 16 gray shades when using FRC alone and to 64 gray shades when FRC and dithering are used in combination. The details of particular methods are not readily available in the literature.

These prior-art methods all suffer from one or more shortcomings. The disadvantages of these previous methods may be classified into three main categories: undesirable visual motion artifacts, undesirable visual static artifacts, and reduced gray shade fidelity.

Undesirable visual motion artifacts may be perceived as "shimmer," "crawl," "ripple," or "waterfalling." The terms used to describe these artifacts are descriptive of subjective perception and are not readily quantifiable. All observed implementations of previous methods (particularly FRC-based processes) have specific gray shade values ("sensitive gray shades") for which one of these artifacts is readily perceivable.

These sensitive gray shades will change from one specific STN LCD panel model to another as a result of differences in panel physical characteristics. Because of this variability among different displays, systems employing these displays have to be tuned to achieve the best result given a combination of the gray scale method and the physical display employed. This normally involves changing the specific FRC implementation and may optionally involve remapping from a sensitive gray shade to an adjacent one that is insensitive, i.e., a gray shade which does not have an undesirable visual motion artifact. Remapping sensitive gray shades to avoid undesirable visual motion artifacts also reduces gray shade fidelity and resolution.

FRC-based motion artifacts are caused by the cyclic nature of the FRC as applied over a small physical area. For a given frame, the FRC is used to assign a value to a pixel within a grid or matrix. This value is compared to the gray shade to determine if the pixel should be "on" or "off." If neighboring pixels cycle harmonically in time with respect to each other, the human eye may perceive motion where none is intended. Virtually all visual motion artifacts are undesirable.

Undesirable static artifacts may be the result of sacrificing spatial resolution to achieve increased perceived gray shades by employing a spatial dithering process. The most noticeable static artifact in spatially-dithered grey scale images is "graininess." If a source gray shade cannot be directly represented, the display system may map the gray shade alternately into the two closest gray shades by dithering. The gritty appearance is caused by high frequency transitions between physically adjacent pixels at a physical resolution the eye can distinguish.

Reduced gray shade fidelity can be manifested as "contouring", also known as Mach banding or "cartooning." For example, contouring causes a smoothly shaded sphere to appear as a series of concentric rings each of a single gray shade. In cartooning, an image has a narrow enough gray shade or color range that images appear to have been drawn with crayons for use in cartoons. Contouring and cartooning are all apparent in processes having a capacity of fewer gray shades than the perceivable visible limit, which is 256 grey shades.

BRIEF DESCRIPTION OF THE INVENTION

The purpose of the present invention is to provide the capability to display gray scale to the limit of human perception (256 shades) using displays having characteristics of or ones similar to super-twisted nematic (STN) liquid crystal displays (LCD). The present invention may be utilized for monochromatic or color displays.

A method is provided according to the present invention for displaying gray scale up to the visible limit (two hundred and fifty-six shades) for displays such as, but not limited to, dual-scan super twisted nematic (DSTN) liquid crystal displays (LCD). The method of the present invention employs a large static matrix of values in concert with a circular queue consumption to distribute energy evenly in both space and time to achieve a large range of gray shades in digital displays with slow rates of response. The grey scale resolution of the method of the present invention depends upon the size of the matrix employed.

A first part of the method addresses minimizing visual motion artifacts and equal distribution of energy over the viewing surface. This is accomplished by assigning addresses to a matrix of pixels. According to the first part of the method of the present invention, a matrix is defined wherein each position in the matrix is defined by a different number or "address". For example, each position in a 16×16 matrix is defined by a different numbered address from 0 to 255. This matrix is repeatedly mapped into the entire pixel matrix of the display in both the horizontal and vertical directions.

Static visual artifacts may be minimized by rotating the matrix columns at the beginning of each horizontally adjacent matrix. For example, in 16×16 matrix, the first matrix in a row includes in order columns 0 through 15. In an embodiment where the column offset is 4, the second matrix to its right begins with column 3 and ends with column 2. The third matrix to its right begins with column 7 and ends with column 6.

The second part of the process primarily addresses the consumption or use of the pixels within the matrix to realize smooth shading of an individual pixel over time. This is accomplished by using a circular queue. The circular queue causes pixel consumption in sequential matrix address order, and provides that within any given number of frames that pixels are used with an even distribution. Each color primary has an independent circular queue per shade. Circular queues for each shade of each color primary may be in arbitrary alignment with respect to each other in order to achieve optimal visual results.

For example, the grey-scale value of a single pixel in a given display image (frame) is compared with the matrix address corresponding to the position of that pixel in the display. The gray-scale value of the pixel and the frame number within a sequence of frames is used to select a range of matrix addresses from a circular queue (the "ON" range). The address of the current pixel is compared to the "ON" range. If the current pixel's value is within that range, then it is switched "ON" for that frame. The default state for failing this test is "OFF."

This method is duplicated for each color primary. The number of frames in a sequence is equal to the number of matrix addresses.

The present invention provides gray shade resolution at the visible limit and therefore does not introduce gray shade infidelities. Dithering is not used, and thus its attendant artifacts do not occur. Motion artifacts are avoided in the present invention by assigning a static value to each pixel within a matrix and by making the matrix physically large enough so that the eye has difficulty perceiving motion. The decision to turn a pixel "on" or "off" is made by comparing the pixel value against a range of values (the "on range"). If the pixel value is within the on range, the pixel is turned "on." The on range is determined for each gray shade and each frame. Avoidance of motion artifacts is also assisted by the large cycle time of the process. For comparison, FRC-based processes typically run over a sixteen frame cycle, while the method of the present invention uses a two hundred fifty-six frame cycle, thus spreading low frequency events over a long sample interval with a high sample rate.

BRIEF DESCRIPTION OF THE DRAWING FIGURES

FIGS. 1a and 1b are examples of two matrices actually used with an embodiment of the present invention.

DETAILED DESCRIPTION OF THE PREFERRED EMBODIMENT

Figure 2:
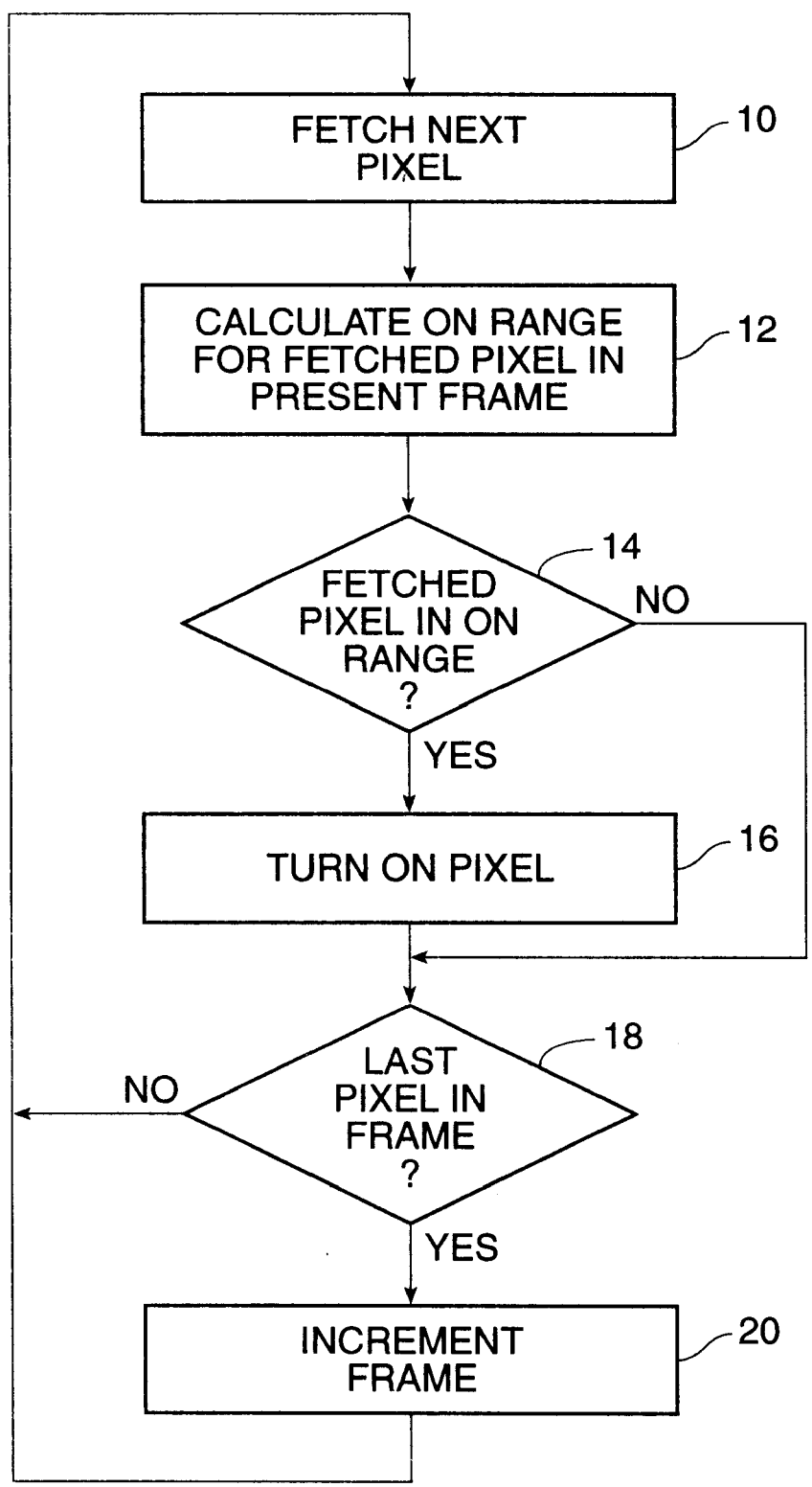
FIG. 2 is a flow diagram illustrating the method for consumption of pixels according to a presently preferred embodiment of the present invention

Those of ordinary skill in the art will realize that the following description of the present invention is illustrative only and not in any way limiting. Other embodiments of the invention will readily suggest themselves to such skilled persons.

For the purposes of the disclosure and claims herein, the term "digital display" refers to a display wherein each pixel may be either "ON" or "OFF". Examples of such displays include, but are not limited to, dual-scan super twisted nematic (DSTN) liquid crystal displays (LCD) and other displays having similar characteristics.

It is not clear that prior-art grey scale display methods utilized the physical characteristic of STN LCD type displays in an advantageous manner. It appears that the prior-art methods used assumed the display's physical characteristics to be undesirable. The method of the present invention seeks to take advantage of the relatively slow rate of change of STN LCD type displays as a means for assisting in the even distribution of energy for a given gray shade over a large area.

The method of the present invention employs a matrix of values and circular queue method of consuming those values. Similar results are believed to be achievable with matrix assignments of values different from the illustrative ones disclosed herein.

According to the method of the present invention, both spatial and temporal aspects of the display technology are advantageously utilized to achieve a grey scale resolution which may be four times that of conventional prior art grey scale display systems. The total area of the display is divided into a plurality of matrices. In the illustrative embodiment disclosed herein, each matrix is a 16×16 pixel area of the display. In a method applied to color displays according to the present invention, a separate matrix is defined for each color component of each pixel in the display. According to another aspect of the method of the present invention, the matrix is repeated in the horizontal and vertical directions, but may be altered from repetition to repetition in order to minimize certain artifacts which might otherwise arise as a result of unintended periodicity.

A method is provided according to the present invention for displaying gray scale up to the visible limit (two hundred and fifty-six shades). The method of the present invention employs a large static matrix of values in concert with a circular queue consumption to distribute energy evenly in both space and time to achieve a large range of gray shades in digital displays with slow rates of response. The grey scale resolution of the method of the present invention depends upon the size of the matrix employed.

Figures 1A, 1B:
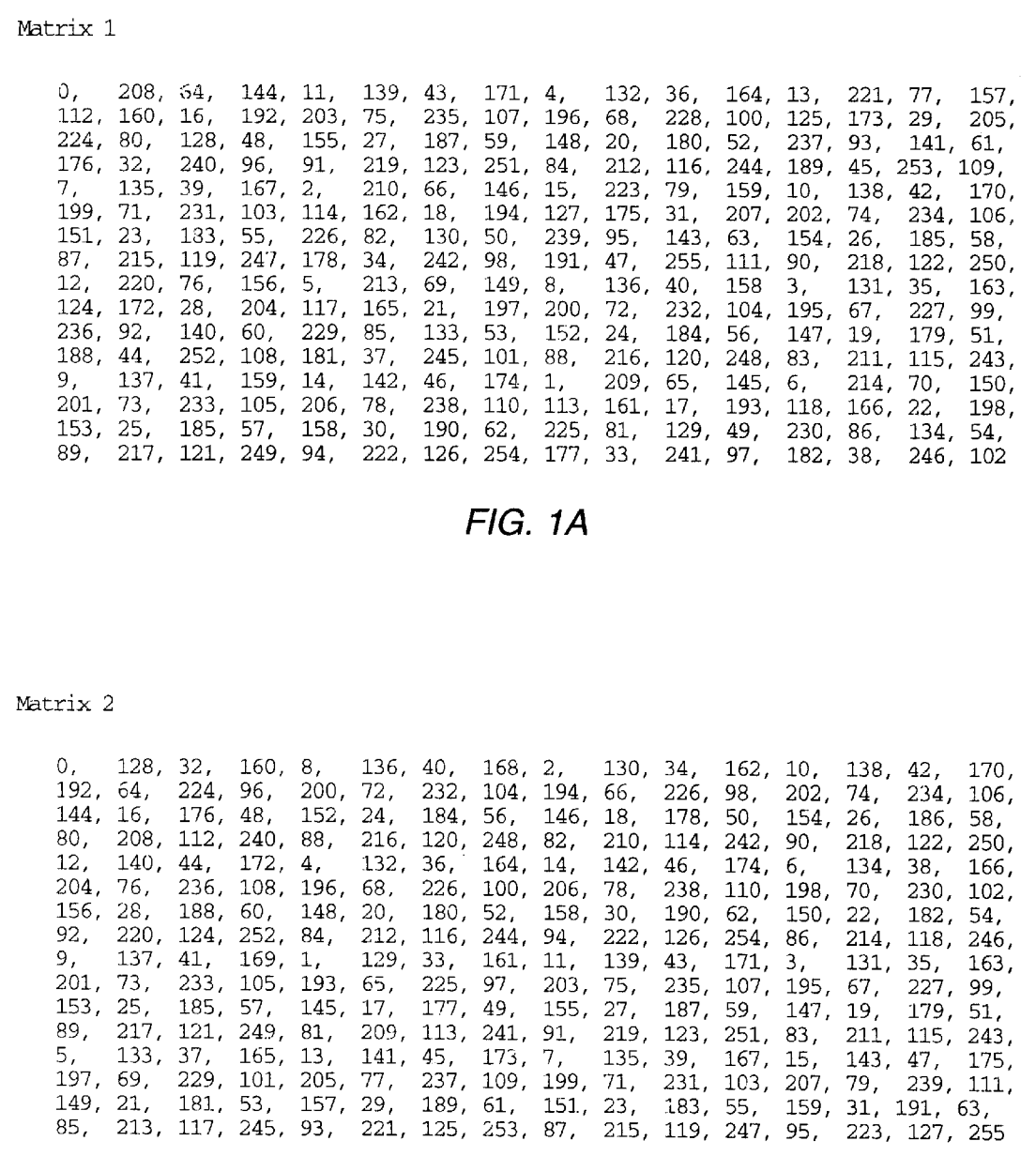

A first part of the method addresses minimizing visual motion artifacts and equal distribution of energy over the viewing surface. This is accomplished by assigning addresses to a matrix of pixels. According to the first part of the method of the present invention, a matrix is defined wherein each position in the matrix is defined by a different number or "address". For example, each position in a 16×16 matrix is defined by a different numbered address from 0 to 255. This matrix is repeatedly mapped into the entire pixel matrix of the display in both the horizontal and vertical directions. Examples of two matrices which have been actually used with an embodiment of the present invention are presented in FIGS. 1a and 1b.

In order to avoid motion artifacts, it is preferable according to the present invention to employ several guidelines for assigning address numbers in the control matrix. These guidelines are not strict rules and may be violated in isolated instances without adversely affecting the performance of the present invention. The application of these guidelines may be seen by examining the adjacent values of the matrices of FIGS. 1a and 1b.

First, it is preferable to avoid placing two consecutive values next to each other in the horizontal, vertical or diagonal directions. The 8 pixels surrounding an assigned pixel value in the control matrix should not have an consecutive address number. A discreet incidental violation, like once out of a sequence may not cause a problem.

Second, placing consecutive number values on the same row, column, or diagonal should be avoided. For example, if the pixel in the upper left corner is assigned a value of 0, and then a pixel is skipped horizontally, the next pixel should not be assigned number 1.

Third, the distribution of the values in the matrix should be even from top to bottom and left to right. For example, if a 16×16 matrix is split vertically, where there are 128 values on the left half and 128 values on the right half, out of the 256 possible values (0–255), it is preferred on have approximately even distribution of values of 127 or less on both the right and left halves of the matrix. The same guideline is preferred for distribution of values between the top and bottom halves of the matrix.

Those of ordinary skill in the art will appreciate that these guidelines should be applied to adjacent pixels across horizontal and vertical matrix boundaries.

Because of the nature of the digital displays such as the STN LCD panel, they tend to exhibit cross talk. When a pixel is turned on or off, the signal sent to that pixel can leak or bleed to adjacent pixels. This may tend to cause annoying static visual artifacts, one of which is manifested as vertical bars of slightly different intensity. This artifact is not noticeable as a phenomenon when the image is a natural image such as a photograph, but when it is an image with highly repetitive content, such as a window background in a computer generated screen, intensity bars or variations in the intensity may appear as vertical bars.

Such static visual artifacts may be minimized by rotating the matrix columns at the beginning of each vertically adjacent matrix. For example, where a 16×16 matrix providing for 256 grey shades is used, the matrices in lines 0 through 16 include in order columns 0 through 15. In an embodiment where the column offset value is 4, the matrices in lines 16 through 31 (the second set of matrices from the top) begin with column 3 and end with column 2. The third set of matrices from the top begin with column 7 and end with column 6. While in the above example, the rotation value is 4, the column rotation value may be programmable according to the present invention so that minor adjustments may be made as needed.

Persons of ordinary skill in the art will observe that, while for ease of both understanding and implementing the present invention, square matrices are preferred, other matrix configurations may be employed without departing from the spirit of the present invention. Some of such other configurations will be non-optimal, however, due to the difficulty of predicting the behavior of neighboring pixels.

The second part of the process primarily addresses the consumption or use of the pixels within the matrix to realize smooth shading of an individual pixel over time. This is accomplished by using a circular queue. The circular queue causes pixel consumption in sequential matrix address order, and provides that within any given number of frames that pixels are used with an even distribution. Each color primary has an independent circular queue per shade. Circular queues for each shade of each color primary may be in arbitrary alignment with respect to each other in order to achieve optimal visual results.

The gray-scale value of the pixel and the frame number within a sequence of frames is used to select a range of matrix addresses from a circular queue (the "ON" range). The address of the current pixel is compared to the "ON" range. If the current pixel's value is within that range, then it is switched "ON" for that frame. If the current pixel's value is outside of that range, then it is switched "OFF" for that frame.

The circular queue is a modulo N list of the control matrix addresses in ascending order, where N is the desired grey scale resolution. The queue recycles back to the beginning when it reaches its end, i.e., in a 256 address matrix having addresses 0–255, the address following 255 is 0.

The range of values is changed for each frame. According to a presently preferred embodiment of the invention, the range of values is equal to the grey scale value of the incoming pixels and for each frame its starting point is incremented by that grey scale value. In each frame, the current incoming pixel value is used and is offset by the frame number multiplied by the current incoming pixel value. The total number of frames is equal to the grey scale resolution. For the example of the 16×16 matrix used herein, there are 256 frames, which may be conveniently referred to as F0–F255. In general, the range of values is determined by:

$$R\min_n = FG + \text{Offset} \qquad [\text{Eq. 1}]$$

and $$R\max_n = R\min_n + (G-1) \qquad [\text{Eq. 2}]$$

where Rmin is the lower end of the range in modulo N, Rmax is the upper end of the range in modulo N, G is the grey scale value of the incoming pixel, F is the frame number, and N is the desired grey scale resolution. For G=0, Rmin/Rmax are ignored and zero is output to the display. Offset is used for multicolor displays, as will be disclosed herein. For black and white displays, the value Offset can have any value.

As an example of the range value assignment, assume a grey scale resolution of 256 grey shades, and an incoming pixel having a grey scale value of 64 (one-quarter of full scale in a range of 0–255). Table 1 illustrates the range of values in successive ones of the 256 frames.

TABLE 1

| Frame Number | Value Range |
| --- | --- |
| F0 | 0–63 |
| F1 | 64–127 |
| F3 | 128–191 |
| F4 | 192–255 |

Those of ordinary skill in the art will recognize that the range of values repeats itself every four frames, or sixty-four times in every 256 frames. Thus, each pixel in the control matrix having a grey scale value of 64 will be turned on for one frame out of every four.

As another example, Table 2 illustrates the range of values in successive ones of the 256 frames for a pixel value of 254:

TABLE 2

| Frame Number | Value Range |
| --- | --- |
| F255 | 2–255 |
| F0 | 0–253 |
| F1 | 254–251 |
| . | . |
| . | . |
| . | . |
| F254 | 4–1 |
| F255 | 2–255 |
| F0 | 0–253 |

In the example of Table 2, those of ordinary skill in the art will recognize that the range of values repeats itself every two hundred and fifty four frames. In general, for any pixel grey shade value "G", the range of "ON" values will repeat itself G times in 256 frames. Persons of ordinary skill in the art will appreciate that the consumption of the values in time is always very periodic. By choice, a matrix address layout is selected that minimizes or avoids the common motion visual artifacts.

Persons of ordinary skill in the art will recognize that the grey scale value of any given pixel in a moving image on the display will likely change from frame to frame. As shown in Eq. 1, the calculation for the starting point of the range of values employs only the current frame number and the grey scale value of the instant incoming pixel. The grey scale value of the incoming pixel at that location in the display in the previous frame is irrelevant.

Referring now to FIG. 2, a flow diagram illustrates the pixel consumption method of the present invention. First, at step 10, the grey scale value for the current pixel to be displayed is fetched from an appropriate place in the pixel pipeline. Next, at step 12, the range of values in the current frame for that pixel is calculated at step 12.

At step 14, the matrix address of the pixel to be displayed is compared with the range of values for the current frame calculated in the previous step. If the pixel address is in range, that pixel is turned on at step 16. After step 16, or if the matrix address of the pixel to be displayed is not within the range of values, the process proceeds to step 18 where it is determined if the current pixel is the last pixel in the current frame. If not, process control is transferred back to step 10 to process the next pixel. If the current pixel is the last pixel in the current frame process control is transferred to step 20 where the frame number is incremented. Process control is then transferred back to step 10 to process the first pixel in the next frame.

In a color digital display, this pixel consumption method described herein is duplicated for each color primary. A problem may be encountered if the range of values in the circular queue is started at the same point for each gray shade for each of the red primaries, the green primaries and the blue primaries. The on points and off points for all the red, green and blue shades will coincide. It is possible that because of the intensity of the red, green, and blue turning off or on at the same time, a more noticeable blink effect would occur.

In order to avoid such artifacts, the ranges of values are offset for each color primary in the display, as indicated by the variable "Offset" in Eq. 1. In the above examples, the ranges of values at F0 started at address 0. If the above examples are assumed to relate to a first primary color in a digital display, the F0 starting addresses for the ranges of values for the other two primary colors would be offset. In an actual 256 frame system fabricated according to the present invention, the range of values for F0 of the second and third primary colors are offset equally so that the F0 range of values for the second primary color begins at 85 and the F0 range of values for the third primary color begins at 170. The values 0, 85, and 170 are each spaced apart by approximately one third of the total address value range of 0–255. According to a presently preferred embodiment of the invention, the color starting point offsets may be programmable so that other values may be selected for the offset.

For comparison, FRC-based processes typically run over a sixteen frame cycle, while the method of the present invention uses a two hundred fifty-six frame cycle, thus spreading low frequency events over a long sample interval with a high sample rate.

The method of the present invention does introduce two different artifacts, referred to herein as "sparkle" and "darkle." Sparkle may be manifested at very low valued gray shades when physically separated individual pixels cycle partially on and then decay to the off state. The darkle artifact is the opposite of sparkle. Darkle occurs at very high valued gray shades when physically separated individual pixels are allowed to cycle partially off. Sparkle and darkle occur over such small gray scale ranges and at such low thresholds of discrimination that they are preferable artifacts in comparison to all of the artifacts of previous methods.

Figure 3:
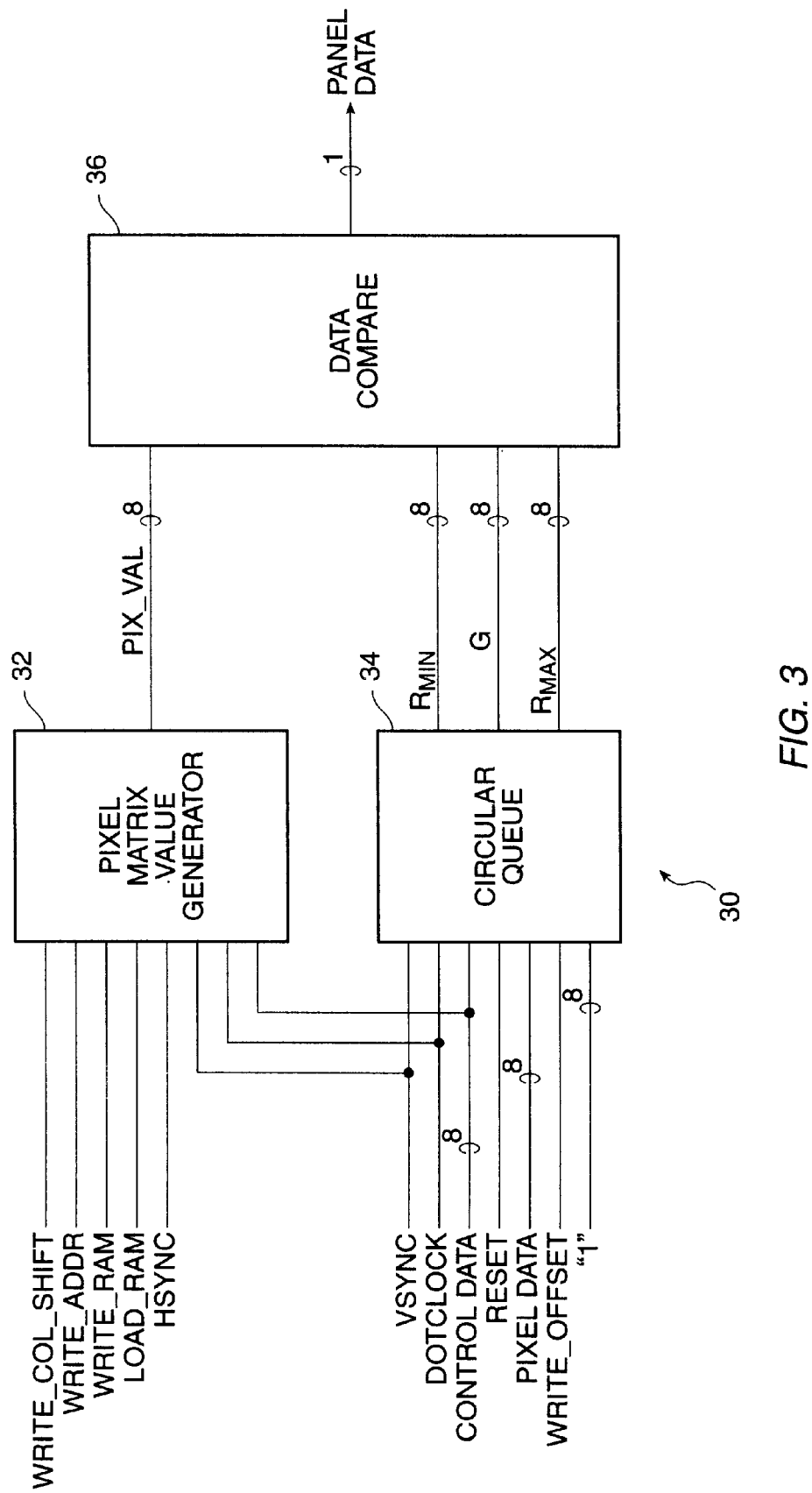
FIG. 3 is a block diagram of a hardware system which may be used to implement the present invention.

Referring now to FIGS. 3 through 10, a block diagram of a hardware system 30 for implementing the present invention is shown. FIG. 3 is a first portion of the block diagram and shows pixel matrix address generator 32, circular queue 34, and data compare unite 36. The following disclosure assumes a 16 by 16 matrix size.

Pixel matrix address generator 32 generates the pixel address PIX_ADDR which is 8 bits in the presently preferred embodiment of the invention employing a 16×16 matrix. Circular queue 34 generates Rmin and Rmax, the upper and lower bounds of the range of values in the queue for which an individual pixel is to be turned on, as well as G, the grey shade value. Data compare unit 36 evaluates the PIX_ADDR and the Rmin and Rmax data from circular queue 34 and generates the signal to turn the current pixel on or off in response thereto. There are several inputs to pixel matrix address generator 32 and circular queue 34.

CONTROL DATA is an eight-bit bus which inputs RAM data, RAM address, column offset value or color offset value into pixel matrix address generator 32 and to circular queue 34. WRITE_COL_SHIFT input is a clock pulse for loading the lower 4-bit CONTROL DATA as a column offset value. WRITE_ADDR is a clock pulse for loading 8-bit CONTROL DATA as an address of the 256×8-bit RAM of FIG. 5 WRITE_RAM is a clock pulse for loading CONTROL DATA as data into the 256×8-bit RAM of FIG. 5. LOAD_RAM selects an address for 256×8-bit RAM. The use of a multipurpose bus like CONTROL DATA and the use of multiple clock signals for capturing data or interest to particular devices on the bus is familiar to those of ordinary skill in the art.

HSYNC is an end-of-line signal and goes high after displaying each line of the current frame. VSYNC is an end-of-frame signal presented to pixel matrix address generator 32 and to circular queue 34, and goes high after displaying all lines of one frame. DOTCLOCK is a clock pulse running at the pixel consumption rate presented to pixel matrix address generator 32 and to circular queue 34 for clocking each pixel value. The combination of DOTCLOCK, HSYNC, VSYNC, and WRITE_COL_SHIFT are used to set the column and row address of the 16×16 matrix as will be disclosed herein. The matrix element is previously downloaded to the 256×8-bit RAM of FIG. 5 by using CONTROL DATA as address and data inputs. Rmin and Rmax is the result from CIRCULAR QUEUE according the color value of pixel, current frame number and color offset value.

RESET resets the frame counter in circular queue 34 to zero and is asserted prior to initial operation of circular queue 34. PIXEL DATA is the 8-bit color value of the current pixel to be displayed.

WRTE_OFFSET is a clock pulse for loading CONTROL DATA as color offset value. PANEL DATA is the output of data compare unit 36 and is either "1" or "0" which is used to turn the panel pixel "on" or "off". Data compare unit 36 will output "1" if PIX_ADDR is greater than or equal to Rmin and less than or equal to Rmax in cases where the queue is not looping. In the case where the queue is looping, data compare unit 36 will output "1" if PIX_ADDR is greater than or equal to Rmin and less than or equal to 255 or if PIX_ADDR is less than or equal to Rmax and greater than or equal to zero. In the special case where the grey shade value of the pixel is zero, data compare unit 36 will output zero. PIX_ADDR is one of the elements of 16×16 matrix.

Figure 4:
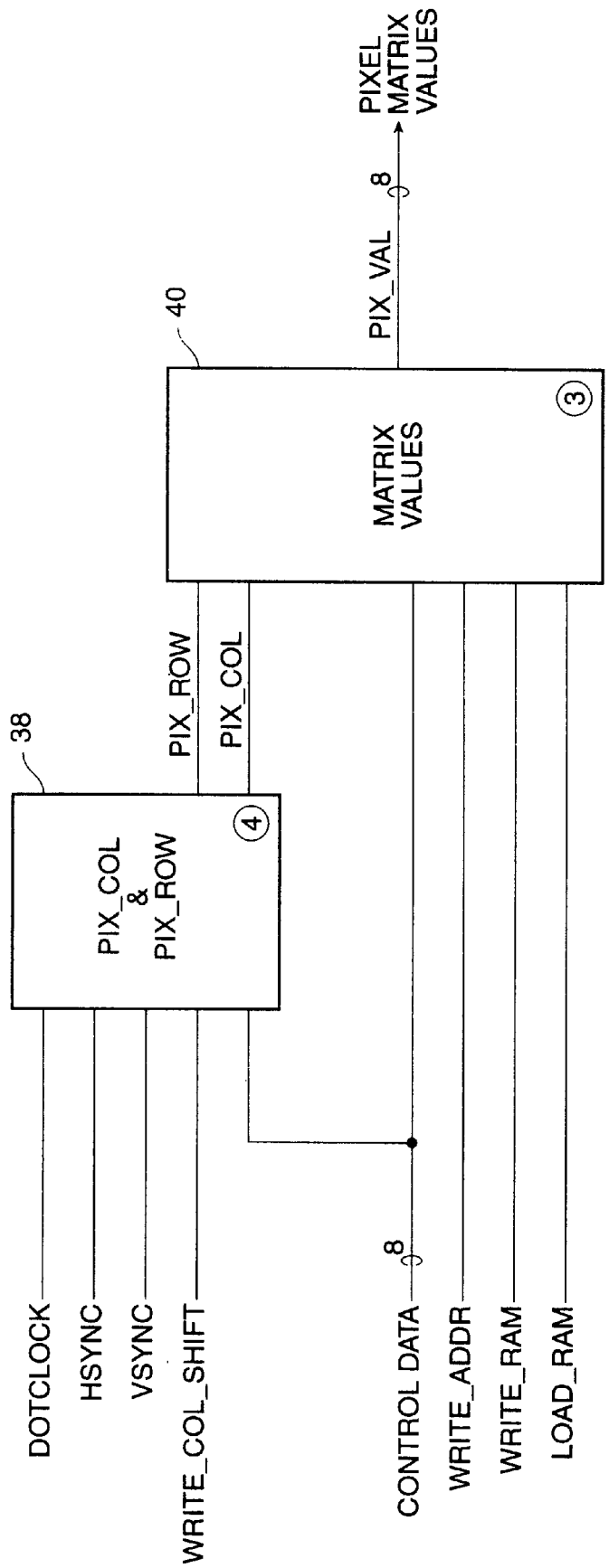
FIG. 4 is a more detailed block diagram of the pixel matrix address generator of FIG. 3.

FIG. 4 is a more detailed block diagram in which the pixel matrix address generator 32 of FIG. 3 is seen to comprise a pixel column and pixel row address generator 38 and pixel matrix address generator 40. The combination of DOTCLOCK, HSYNC, VSYNC, and WRITE_COL_SHIFT inputs to pixel column and pixel row address generator 38 are used to generate the column and row address of the 16×16 matrix as outputs PIX_COL and PIX_ROW. The PIX_COL (column address of 16×16 matrix) and PIX_ROW (row address of 16×16 matrix) are used as addresses for fetching the matrix element from pixel matrix address generator 40 when LOAD_RAM is low. When LOAD_RAM is high CONTROL DATA will be used as data input with WRITE_RAM high to write a 16×16 matrix element to the 256×8-bit RAM (shown in FIG. 5).

Figure 5:
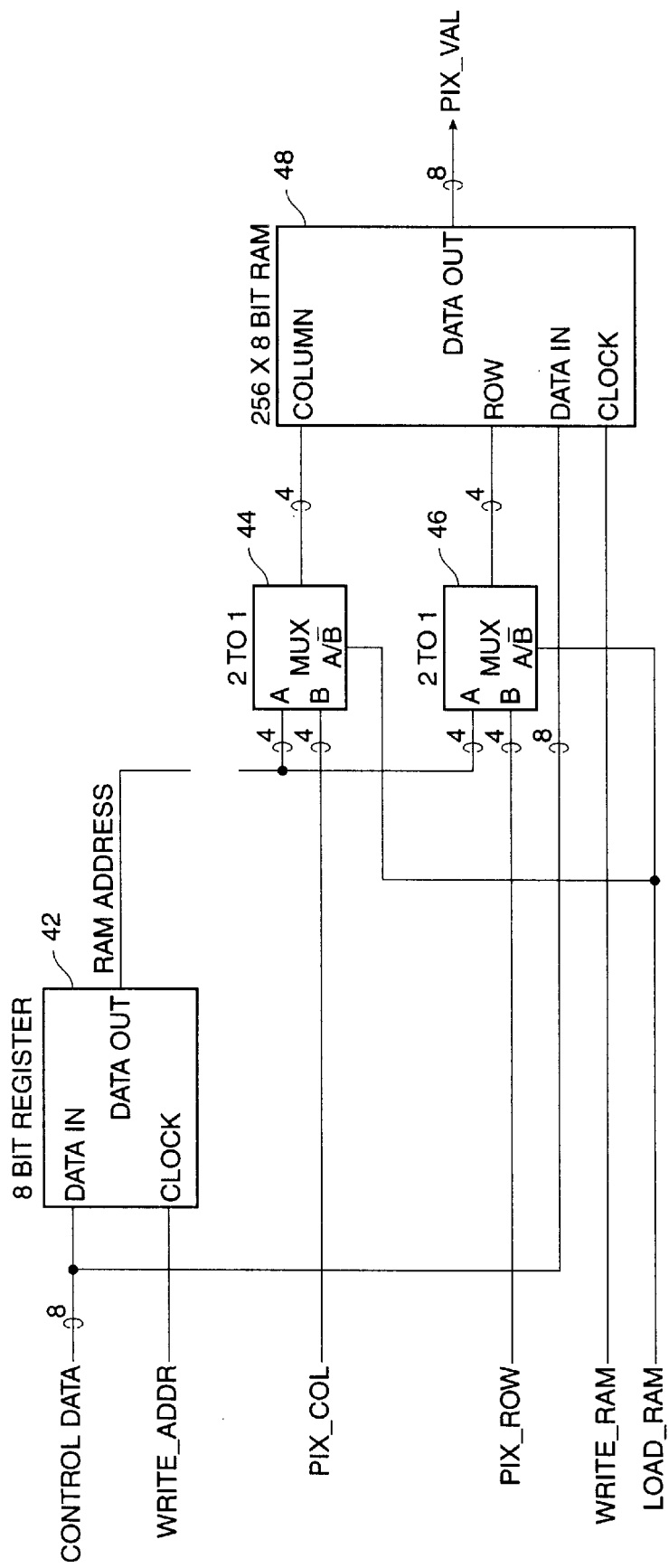
FIG. 5 is a more detailed block diagram of the matrix addresses block of FIG. 4.

FIG. 5 is a more detailed block diagram of the pixel matrix address generator 40 block of FIG. 4. When WRITE_ADDR is high, the CONTROL DATA input will load 8-bit register 42 with RAM ADDRESS. When LOAD_RAM is HIGH, the RAM ADDRESS will pass through the A inputs of 2:1 multiplexers 44 and 46 as column and row addresses, respectively, for the 256×8-bit RAM 48. CONTROL DATA input will load to the 256×8-bit RAM location indicated by RAM ADDRESS when WRITE_RAM is HIGH. When LOAD_RAM is LOW, the PIX_COL and PIX_ROW data will pass through the B inputs of 2:1 multiplexers 44 and 46 and the PIX_ADDR will be valid.

Figure 6:
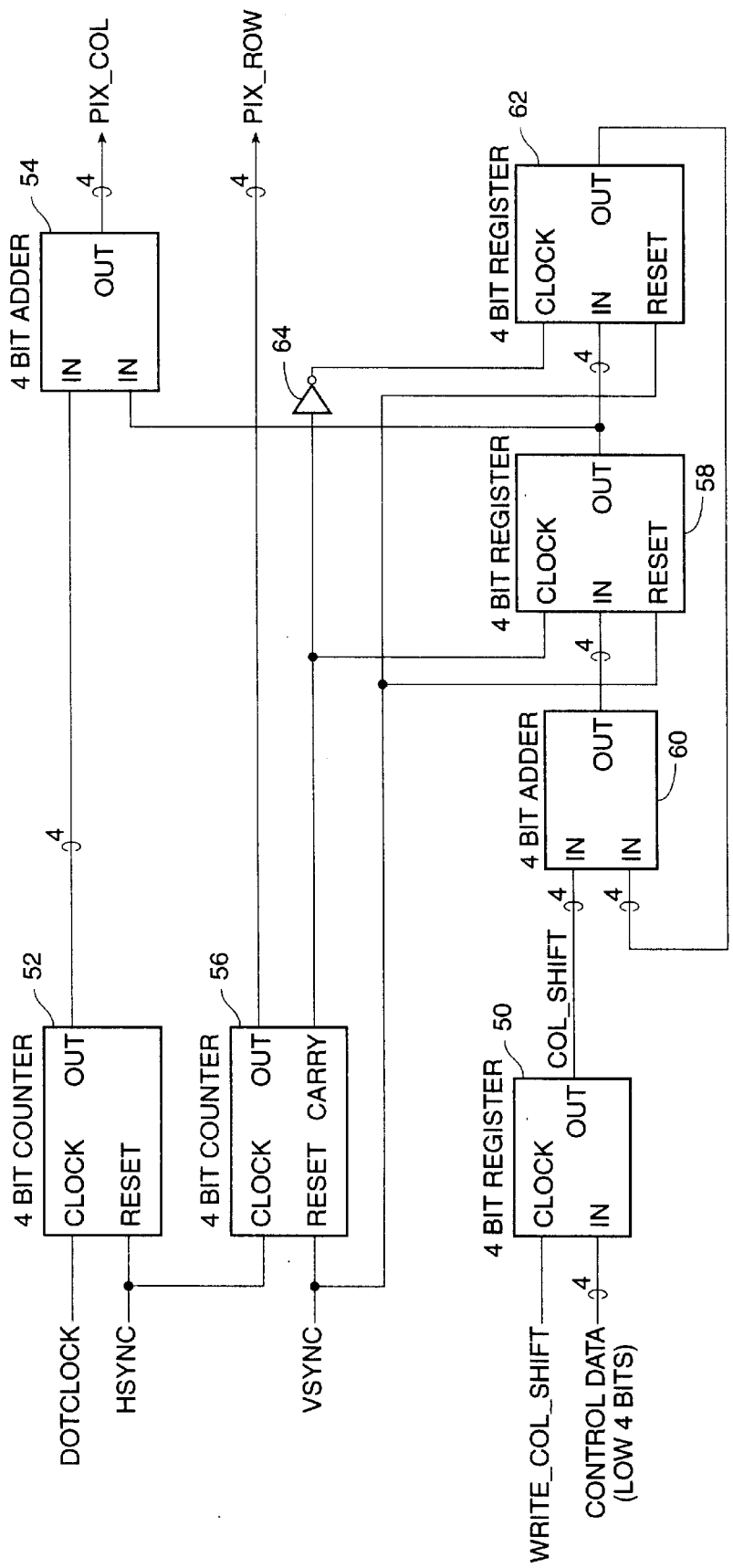
FIG. 6 is a more detailed block diagram of the pixel column and pixel row address generator of FIG. 4.

FIG. 6 is a more detailed block diagram of the pixel column and pixel row address generator 38 of FIG. 4. Every 16 lines vertically down the display frame, the column offset value will be added to the previous accumulated column offset value for the next 16 vertical lines.

The initial column offset value (COL_SHIFT) is loaded to 4-bit register 50 by inputting the lower 4 bits of CONTROL DATA when the WRITE_COL_SHIFT signal at its clock input goes high. Four-bit counter 52 is clocked by the DOTCLOCK signal and its output, representing the raw column number 0–15, is presented to adder 54 whose function is to add the offset value to it to produce the output PIX_COL as will be described herein. Four-bit counter 56 is clocked by the HSYNC signal. The CARRY signal of 4-bit counter 64 will indicate that 16 columns have passed and will clock 4-bit register 58 to provide a new offset value to the 4-bit adder 54.

Four-bit register 50, 4-bit adder 60, 4-bit register 58, and 4-bit register 62 perform the function of incrementing the column offset every 16 lines of each frame. At the beginning of each line of display pixels, HSYNC resets 4-bit counter 52. At the beginning of each frame, VSYNC resets 4-bit register 58, 4-bit register 62, and 4-bit counter 56 to zero. During the first 16 lines in a frame, the zero-value output of 4-bit register 58 is added to the raw column data from 4-bit counter 52, resulting in no offset. During this time the zero-value output of 4-bit register 62 is presented to 4-bit adder 60, causing its output to equal COL_SHIFT.

After the first 16 lines have been counted, the carry output of 4-bit counter 56 clocks the value COL_SHIFF into 4-bit register 58. For the next 16 lines, the 4-bit adder 54 will increment the raw column data from 4-bit counter 52 by the quantity COL_SHIFT. During this time the output of 4-bit register 62, which has now been set to COL_SHIFT by clocking through inverter 64 for synchronization, is presented to 4-bit adder 60, causing its output to equal a value of twice COL_SHIFT.

After the second 16 lines have been counted, the carry output of 4-bit counter 52 clocks the value of twice COL_SHIFT into 4-bit register 58. For the next 16 lines, the 4-bit adder 54 will increment the raw column data from 4-bit counter 52 by the quantity equal to twice COL_SHIFT. During this time the output of 4-bit register 62, which has now been set to twice COL_SHIFT, is presented to 4-bit adder 60, causing its output to equal a value of three times COL_SHIFT.

From the above disclosure, persons of ordinary skill in the art will observe that, for each group of 16 lines of display following the first group of 16 lines, the PIX_COL output will be offset by a value of n times COL_SHIFT, where n is the nth repetition of 16 lines in the frame.

After displaying each line, the HSYNC will again go high and reset the 4bit counter 52 to zero for the beginning of the next line. Four-bit counter 56 is clocked by the HSYNC signal to produce the output PIX_ROW, a value between 0–15. This counter is reset when VSYNC goes HIGH, indicating the end of a frame.

Figure 7:
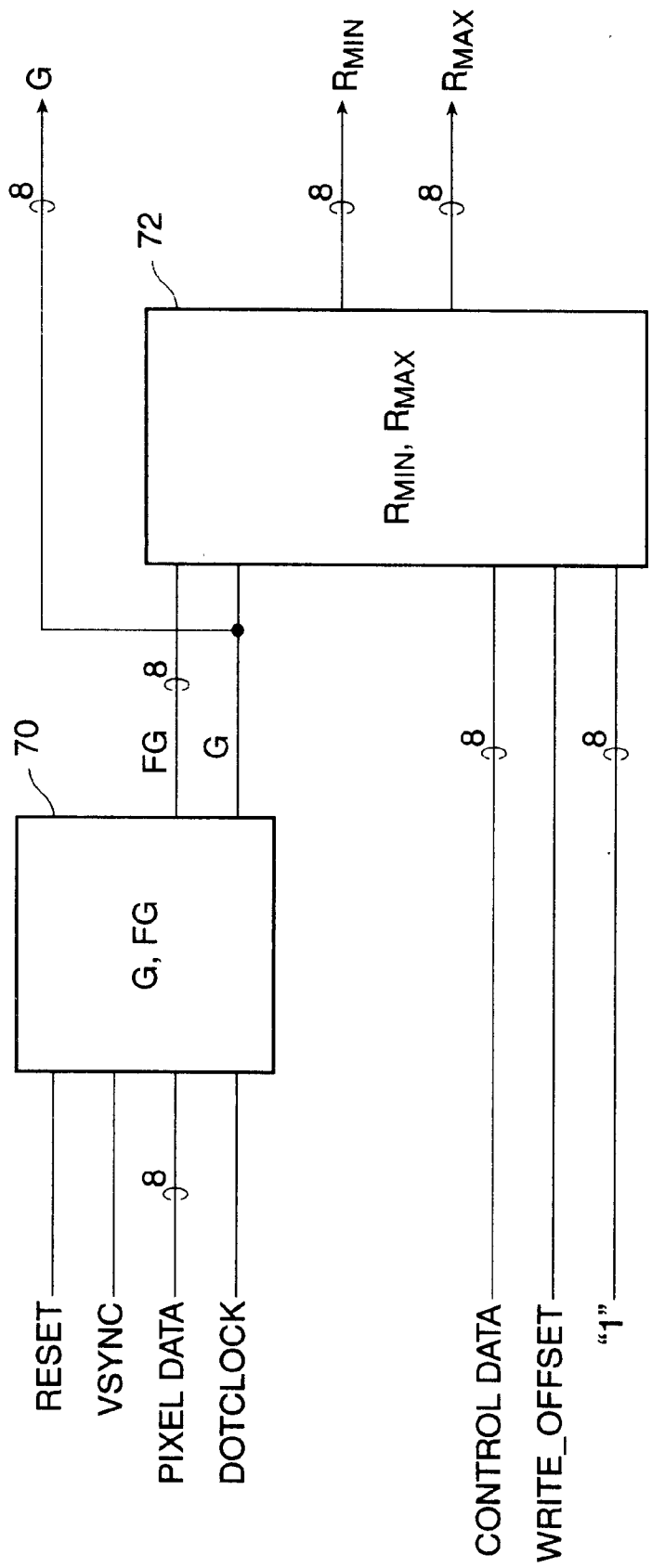
FIG. 7 is a more detailed block diagram of the circular queue of FIG. 3.

FIG. 7 is a more detailed block diagram of the circular queue 34 of FIG. 3. The G,FG unit 70 (G=Gray Shade and FG=Frame Number times Gray Shade) will generate value of gray shade G and value of frame number times gray shade FG. The grey shade is simply the value of the input PIXEL DATA and the value FG is determined from VSYNC as will be more particularly disclosed with reference to FIG. 8 herein.

The value of gray shade G and value of frame number times gray shade FG from G,FG unit 70 are presented to Rmin Rmax generator 72. The offset which will be added add to the boundary values (Rmin and Rmax) is loaded from CONTROL DATA when WRITE_OFFSET goes HIGH. "1" is a constant value which is use for subtracting the value "one" from G (Gray Shade).

Figure 8:
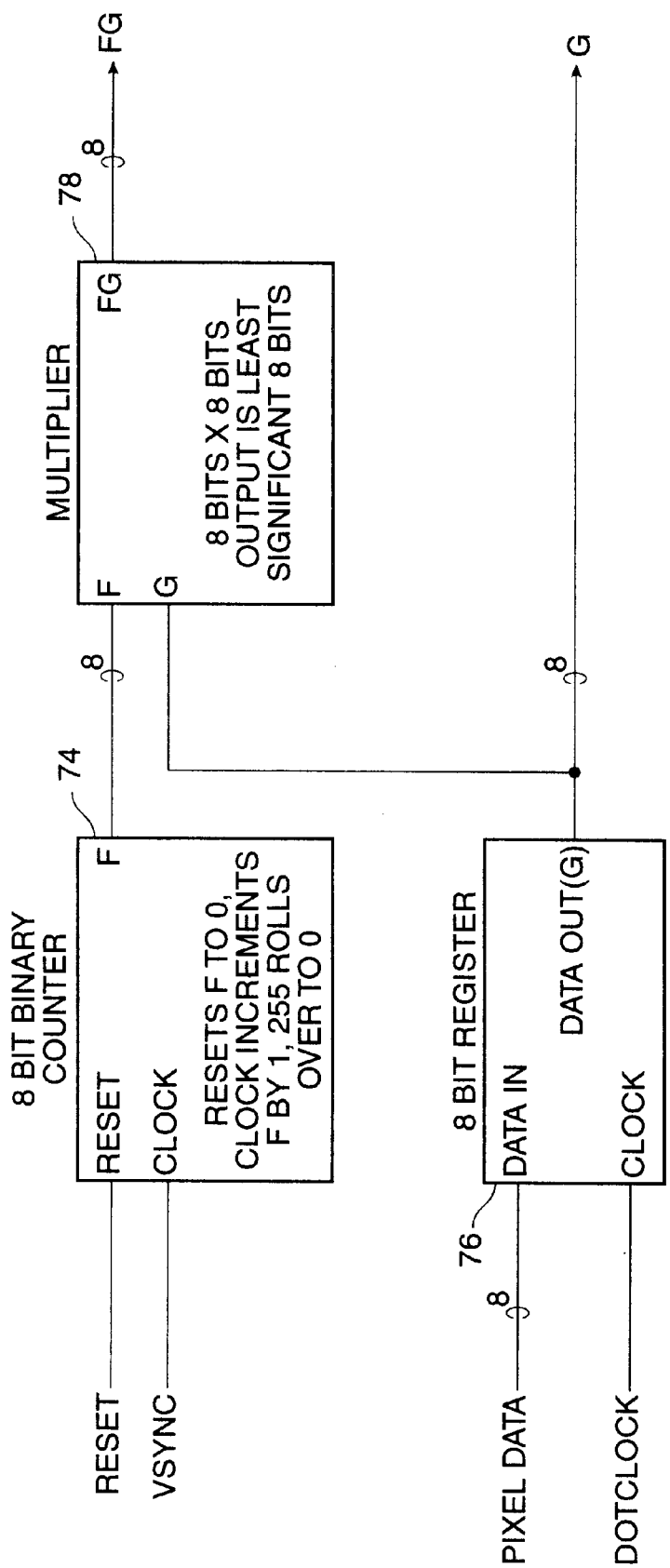
FIG. 8 is a more detailed block diagram of the G,FG unit of FIG. 7.

FIG. 8 is a more detailed block diagram of the G,FG unit 70 of FIG. 7. An 8-bit binary counter 74 will increment F(Frame Number) output by one each time VSYNC goes high, indicating the end of a frame. Counter 74 will roll 255 over to zero. The 8-bit binary counter 74 will be reset to zero when RESET goes high, indicating the start of frame sequence for initial operation. PIXEL DATA (the grey scale value of the current pixel) will be clocked to 8-bit register 76 when DOTCLOCK goes high. The G(Gray Shade) output of register 76 is multiplied by the F(Frame Number) output of 8-bit counter 74 in multiplier 78. The least significant 8-bit output of multiplier 78 is FG(Frame Number times Gray Shade).

Figure 9:
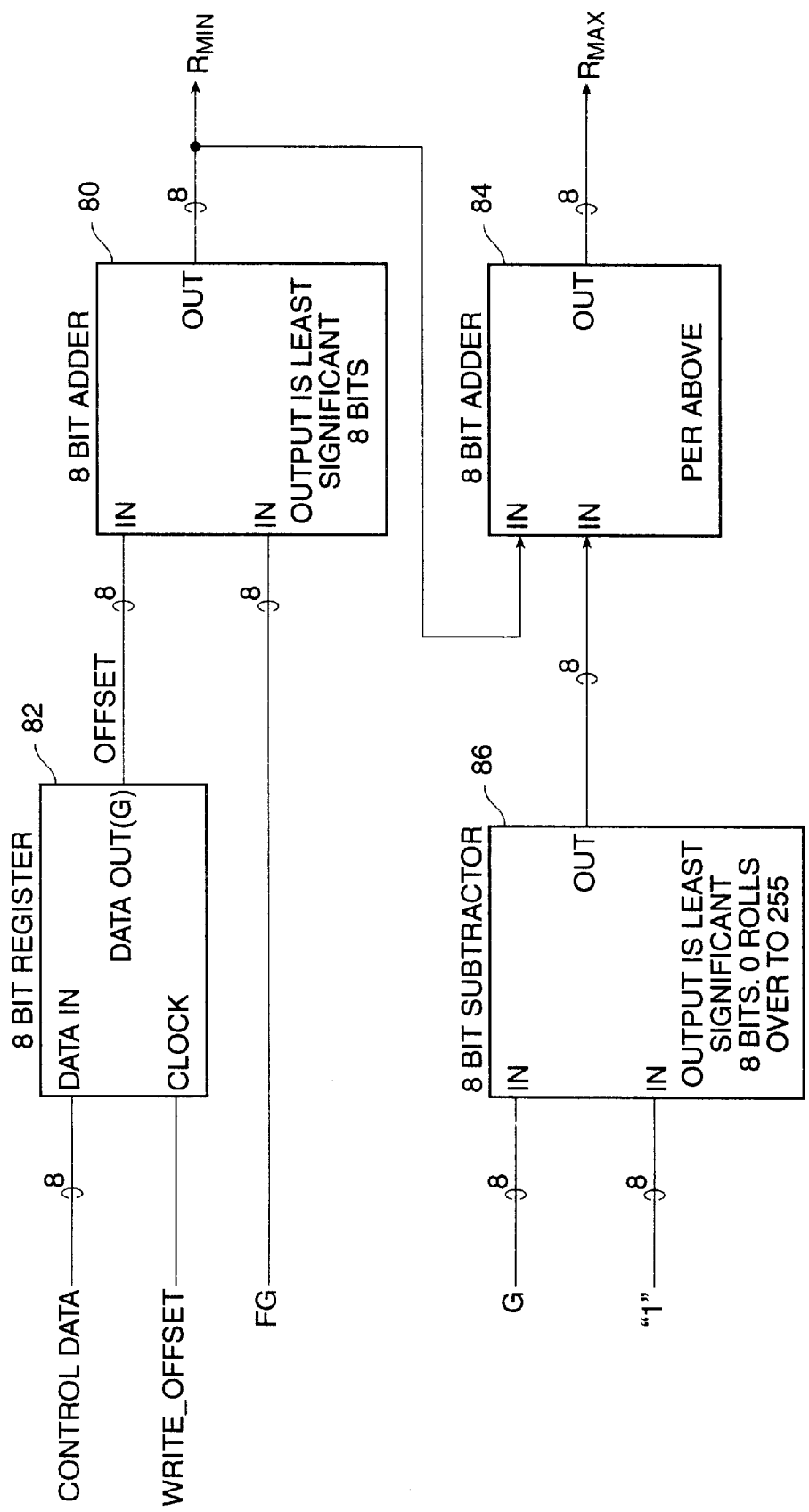
FIG. 9 is a more detailed block diagram of the Rmin Rmax unit of FIG. 7.

FIG. 9 is a more detailed block diagram of the Rmin Rmax unit 72 of FIG. 7. Rmin is generated by adding the FG(Frame Number times Gray Shade) value with the color offset in 8-bit adder 80. The color offset is loaded from CONTROL DATA into 8-bit register 82 with WRITE_OFFSET high.

Rmax is generated by adding Rmin with the quantity G(Gray shade) minus one in 8-bit adder 84. The output of 8-bit adder 84 is the least significant 8 bit result. The output of subtractor is least significant 8 bits result with 0 rolling over to 255. The quantity G(Gray shade) minus one is calculated in subtractor 86.

Figure 10:
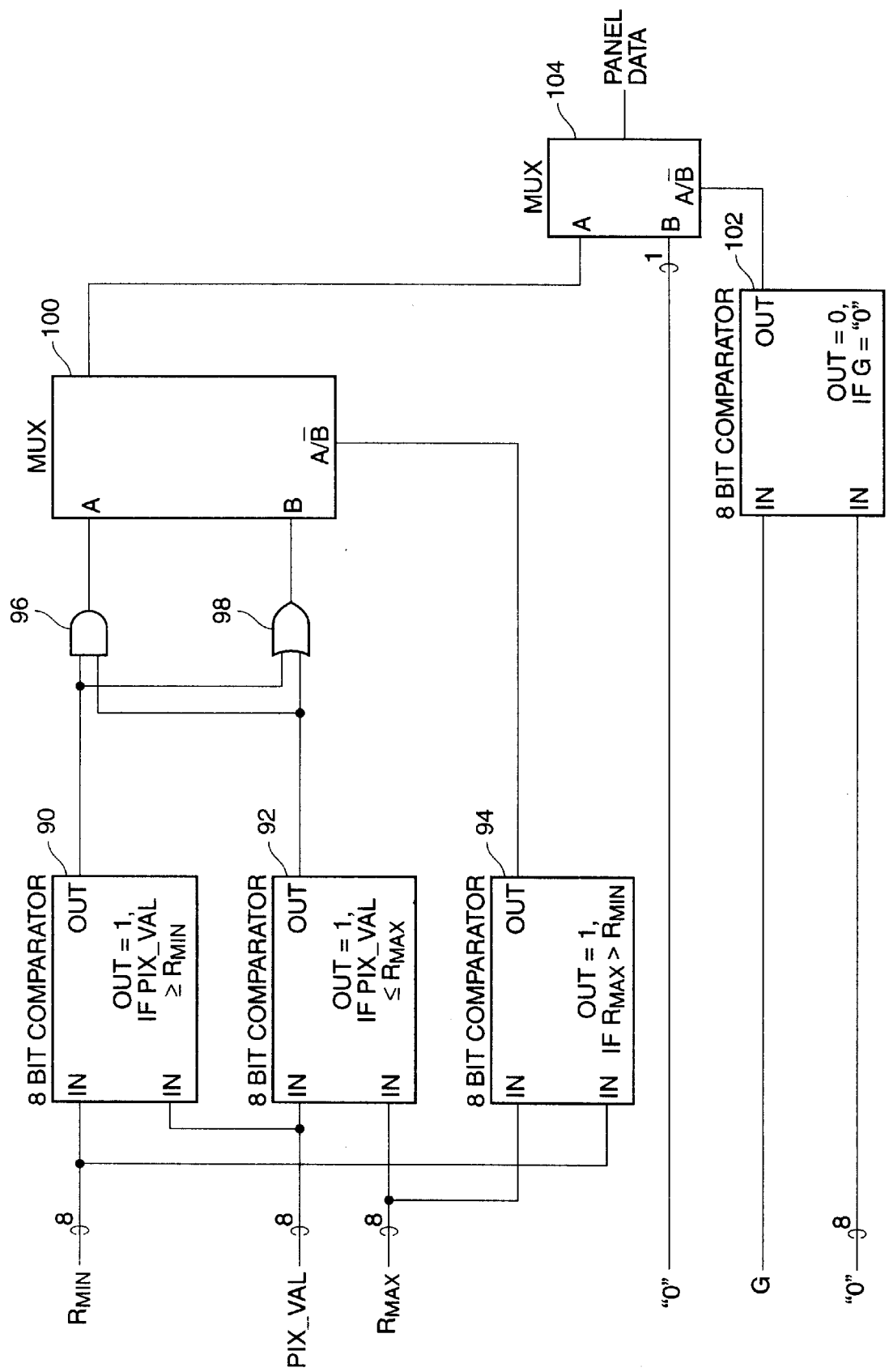
FIG. 10 is a more detailed block diagram of the data compare unit of FIG. 3.

FIG. 10 is a more detailed block diagram of the data compare unit 36 of FIG. 3. The output of a first 8-bit comparator 90 is set to one if PIX_ADDR is greater than or equal to Rmin. The output of second 8-bit comparator 92 is set to one if PIX_ADDR is less than or equal to Rmax. The output of third comparator 94 is set to zero if Rmax is less than Rmin, a condition which occurs when the circular queue address range loops from 255 to zero.

The output of AND gate 96 is set to one if the outputs of both comparators 90 and 92 are set to one, indicating a pixel in the valid address ranges for cases where queue looping is not a consideration. The output of OR gate 98 is set to one if either the output of comparator 90 or 92 is set to one, indicating pixel in the valid address ranges for cases where queue looping is a consideration.

If the output of comparator 94 is set to zero, queue looping is not occurring, and thus multiplexer 100 passes the output of AND gate 96. If the output of comparator 94 is set to one, queue looping is occurring, and thus multiplexer 100 passes the output of OR gate 98.

In the special case where the grey shade G of the incoming pixel is zero, comparator 102 causes 8-bit wide multiplexer 104 to pass a hardwired zero to its output PANEL DATA. Otherwise, comparator 102 causes multiplexer 104 to pass the output of multiplexer 100 to PANEL DATA.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for displaying grey-scale images at a desired grey scale resolution on a display having a matrix of pixels, comprising the steps of:
    defining one or more control matrices, said control matrices having a size equal to the desired grey scale resolution of the display, each position in said control matrices having an assigned value in a range with a size equal to the desired grey scale resolution;
    horizontally and vertically mapping said control matrices into said display a number of times, such that each pixel in the matrix of pixels in the display corresponds to a location in one of the control matrices mapped into said display;
    comparing the control matrix value of each pixel in a frame of an image to be displayed on said display to an ON range and turning that pixel on if the control matrix value of that pixel is within said ON range, the extent of said ON range being equal to the grey scale value of that pixel and contained in a circular queue having a size equal to said desired grey scale resolution; and
    changing the ON range in said circular queue for each successive frame by an amount equal to the grey scale value of that pixel.

2. The method of claim 1 wherein the step of changing the ON range in said circular queue for each successive frame comprises the step of changing said ON range by an amount equal to the grey scale value of the pixel to be displayed.

3. The method of claim 1 wherein each grey scale value for each incoming pixel includes a plurality of color components, and wherein the step of comparing said control matrix value of each pixel in a frame of an image to be displayed on said display to an ON range and turning that pixel on if the control matrix value of that pixel is within said ON range and the step of changing the ON range in said circular queue for each successive frame by an amount sufficient to ensure that ON ranges successive frames are non overlapping comprises separately performing these steps for each color component.

4. The method of claim 3 wherein the ON ranges for said plurality of color components are offset from one another in each frame.

5. The method of claim 3 wherein said plurality of color components comprises a red, a green, and a blue component.

6. The method of claim 4 wherein said plurality of color components comprises a red, a green, and a blue component.

7. A method for displaying grey-scale images at a desired grey scale resolution on a display having a matrix of pixels, comprising the steps of:
    defining one or more control matrices, said control matrices having a size at least equal to the desired grey scale resolution of the display, each position in said control matrices having an assigned value in a range with a size equal to the desired grey scale resolution;
    horizontally and vertically mapping said control matrices into said display a number of times such that each pixel in the matrix of pixels in the display corresponds to a location in one of the control matrices mapped into said display; and
    comparing control matrix value of each pixel in a frame of an image to be displayed on said display to an ON range and turning that pixel on if the control matrix value of that pixel is within said ON range, the extent of said ON range being equal to the grey scale value of that pixel and being contained in a circular queue having a size equal to said desired grey scale resolution, said ON range for each frame F beginning at a value Rmin equal to (FG+Offset) modulo N and ending at a value Rmax equal to (Rmin+(G−1)) modulo N, where G is the grey scale value of the current pixel, F is the frame number, and N is the desired grey scale resolution.

8. The method of claim 7 wherein each grey scale value for each incoming pixel includes a plurality of color components, and wherein the step of comparing the control matrix value of each pixel in a frame of an image to be displayed on said display to an ON range and turning that pixel on if the control matrix value of that pixel is within said ON range and the step of changing the ON range in said circular queue for each successive frame by an amount sufficient to ensure that ON ranges for successive frames are non overlapping comprises separately performing these steps for each color component.

9. The method of claim 8 wherein the ON range for said plurality of color components are offset from one another in each frame.

10. The method of claim 8 wherein said plurality of color components comprises a red, a green, and a blue component.

11. The method of claim 9 wherein said plurality of color components comprises a red, a green, and a blue component.

12. A method for displaying grey-scale images at a desired grey scale resolution on a display having a matrix of pixels, comprising the steps of:
    defining one or more control matrices, said control matrices having a size equal to at least the desired grey scale resolution of the display, each position in said control matrices having an assigned value in a range equal to the desired grey scale resolution;
    horizontally and vertically mapping said control matrices into said display such that each pixel in the matrix of pixels in the display corresponds to a location in one of the control matrices mapped into said display;
    comparing control matrix value of each pixel in a frame of an image to be displayed on said display to an ON range and turning that pixel on if the control matrix value of that pixel is within said ON range, the extent of said ON range being equal to the grey scale value of that pixel and contained in a circular queue having a size equal to said desired grey scale resolution; and changing the ON range in said circular queue for each successive frame by an amount equal to the grey scale value of that pixel.

13. The method of claim 12 wherein the step of horizontally and vertically mapping said control matrix into said display includes the step of offsetting the column order of matrices in vertically adjacent mappings of said control matrix.

14. A method for displaying grey-scale images at a desired grey scale resolution on a display having a matrix of pixels, comprising the steps of:

defining one or more control matrices, said control matrices having a size equal to at least the desired grey scale resolution of the display, each position in said control matrices having an assigned value in a range equal to the desired grey scale resolution;

horizontally and vertically mapping said control matrices into said display such that each pixel in the matrix of pixels in the display corresponds to a location in one of the control matrices mapped into said display, offsetting the column order of matrices in vertically adjacent mappings of said control matrix;

comparing control matrix value of each pixel in a frame of an image to be displayed on said display to an ON range and turning that pixel on if the control matrix value of that pixel is within said ON range, the extent of said ON range being equal to the grey scale value of that pixel and contained in a circular queue having a size equal to said desired grey scale resolution; and changing the ON range in said circular queue for each successive frame by an amount equal to the grey scale value of that pixel.

15. The method of claim 1, wherein said defining step includes placing values in said one or more matrices without placing two consecutive values next to each other in the horizontal, vertical, or diagonal directions.

16. The method of claim 1, wherein said defining step includes placing values in said one or more matrices without placing consecutive values on the same row, column, or diagonal.

17. The method of claim 1, wherein said defining step includes placing values in said one or more matrices such as the distribution of values within each matrix is approximately even from top to bottom and left to right.

18. The method of claim 7, wherein said defining step includes placing values in said one or more matrices without placing two consecutive values next to each other in the horizontal, vertical, or diagonal directions.

19. The method of claim 7, wherein said defining step includes placing values in said one or more matrices without placing consecutive values on the same row, column, or diagonal.

20. The method of claim 7, wherein said defining step includes placing values in said one or more matrices such as the distribution of values within each matrix is approximately even from top to bottom and left to right.

21. The method of claim 12, wherein said defining step includes placing values in said one or more matrices without placing two consecutive values next to each other in the horizontal, vertical, or diagonal directions.

22. The method of claim 12, wherein said defining step includes placing values in said one or more matrices without placing consecutive values on the same row, column, or diagonal.

23. The method of claim 12, wherein said defining step includes placing values in said one or more matrices such as the distribution of values within each matrix is approximately even from top to bottom and left to right.

* * * * *

UNITED STATES PATENT AND TRADEMARK OFFICE
CERTIFICATE OF CORRECTION

PATENT NO. : 6,034,663
DATED : March 7, 2000
INVENTOR(S) : Carrell R. Killebrew, Jr., Jian Lin, Shin-hua Chang It is certified that error appears in the above-identified patent and that said Letters Patent is hereby corrected as shown below:

Title page,
Title, replace "METHOD OF PROVIDING GREY SCALE" with -- METHOD OF PROVIDING GRAY SCALE --.

ABSTRACT,
Line 1, replace "grey-scale images at a desired grey" with -- gray-scale images at a desired gray --.
Line 2, replace "scale resolution on" with -- scale resolution up to the visible limit on --.
Line 4, replace "size smaller than entire display and equal" with -- size equal --.
Line 5, replace "grey scale" with -- gray scale --
Line 6, replace "having an address" with -- having a value --
Line 10, replace "an address" with -- a location --.
Line 11, replace "matrix address" with -- matrix value --
Line 12, replace "display to a" with -- display to an ON --
Line 13, replace "range of address values" with -- range --.
Lines 13-14, replace "the grey scale value" with -- the matrix value --
Lines 14-15, replace "within the range of address values, the range of address values arranged" with -- within the ON range, the ON range arranged --
Line 16, replace "being equal to the grey scale" with -- having an extent equal to the gray scale --.
Line 17, replace "the range of address values" with -- the ON range --
Line 17, replace "queue for" with -- queue for each --.
Line 18, replace "grey" with -- gray --.

Column 1,
Line 8, replace "providing grey" with -- providing gray --.
Line 11, replace "producing grey" with -- producing gray --.
Line 19, replace "grey-scale images" with -- gray-scale images --
Line 63, replace "grey scale images" with -- gray scale images --.

Column 2,
Line 14, replace "256 grey" with -- 256 gray --.
Line 31, replace "The grey scale" with -- The gray scale --
Line 33, replace "of the matrix employed." with -- of the matrix employed. The gray shades are realized in the present invention by cycling individual pixels on and off within a sequence of frames. The length of the sequence is equal to the gray scale resolution. For example, if the desired gray scale resolution is N, to realize gray scale shade M, a pixel is on M frames in every N frames, or the duty cycle is M/N. --.
Line 37, replace "addresses to a matrix of pixels" with -- values to a matrix --.
Line 39, replace "matrix is defined by a" with -- matrix contains a --.

UNITED STATES PATENT AND TRADEMARK OFFICE
CERTIFICATE OF CORRECTION

PATENT NO. : 6,034,663
DATED : March 7, 2000
INVENTOR(S) : Carrell R. Killebrew, Jr., Jian Lin, Shin-hua Chang It is certified that error appears in the above-identified patent and that said Letters Patent is hereby corrected as shown below:

Column 2 (cont),
Line 40, replace "number or 'address'" with -- number or 'value' --
Line 41, replace "numbered address from" with -- numbered value from --.
Line 46, replace "each horizontally" with -- each vertically --
Lines 49-51, replace "the second matrix to its right begins with column 3 and ends with column 2. The third matrix to its right begins with column 7 and ends with column 6." with -- the first row of matrices below in begins with column 4 and ends with column 3. The second row of matrices below begins with column 8 and ends with column 7 --.
Line 53, replace "primarily addresses" with -- primarily defines --
Line 64 to column 3, line 4, replace " For example, the grey-scale value of a single pixel in a given display image (frame) is compared with the matrix address corresponding to the position of the pixel in the display. The gray-scale value of the pixel and the frame number within a sequence of frames is used to select a range of matrix addresses from a circular queue (the "ON" range)." with -- The gray-scale value of the pixel and the frame number within a sequence of frames is used to select a range of matrix values from a circular queue (the "ON" range). --.

Column 3,
Line 5, replace "The address of the current pixel" with -- The location of the current pixel is used to determine the matrix value of the current pixel. The matrix value of the current pixel --.
Line 6, replace "pixel's value" with -- pixel's matrix value --
Line 11, replace "matrix addresses." with -- locations and values in each matrix. --.
Line 20, replace "pixel value" with -- pixel's matrix value --.
Line 20, replace "(the "on range")" with -- (the "ON range") --.
Line 21, replace "the pixel value is within the on range." with -- the pixel's matrix value is within the ON range --.
Line 22, replace "The on range" with -- The ON range --.
Line 39, replace "matrix address generator of FIG. 3." with -- matrix value generator of FIG. 3. --.
Line 41, replace "address block of FIG. 4." with -- value block of FIG. 4. --.

Column 4,
Line 3, replace "prior-art grey scale" with -- prior-art gray scale --
Line 19, replace "achieve a grey scale resolution" with -- achieve a gray scale resolution --.
Line 20, replace "conventional prior art grey" with -- conventional prior art gray --.
Lines 24-26, replace "display. In a method applied to color displays according to the present invention, a separate matrix is defined for each color component of each pixel in the display. According to" with -- display. According to --.

UNITED STATES PATENT AND TRADEMARK OFFICE
CERTIFICATE OF CORRECTION

PATENT NO. : 6,034,663
DATED : March 7, 2000
INVENTOR(S) : Carrell R. Killebrew, Jr., Jian Lin, Shin-hua Chang It is certified that error appears in the above-identified patent and that said Letters Patent is hereby corrected as shown below:

Column 4 (cont),
Line 38, replace "response. The grey" with -- response. The gray --.
Line 40, replace "matrix employed." with -- matrix employed. The gray shades are realized in the present invention by cycling individual pixels on and off within a sequence of frames. The length of the sequence is equal to the gray scale resolution. For example, if the desired gray scale resolution is N, to realize gray scale shade M, a pixel is on M frames in every N frames, or the duty cycle is M/N. --.
Line 44, replace "addresses to a matrix of pixels." with -- values to a matrix of pixels. --.
Line 46, replace "position in the matrix is defined by a different " with -- position in the matrix contains a different --.
Line 47, replace "number or "address". For example," with -- number or "value". For example, --.
Line 48, replace "numbered address from" with -- numbered value from --
Line 56, replace "assigning address numbers in the control matrix." with -- assigning values in the control matrix. --.
Line 65, replace "control matrix should not have an" with -- control matrix should not have a --.
Line 66, replace "address number. A discreet incidental violation," with -- value. A discreet incidental violation, --.

Column 5,
Line 32, replace "256 grey shades" with -- 256 gray shades --.
Line 33, replace "through 16 include." with -- through 15 include --.
Line 36, replace "column 3 and end with column 2." with -- column 4 and end with column 3. --.
Line 37, replace "with column 7 and" with -- with column 8 and --.
Line 38, replace "with column 6." with -- with column 7. --.
Line 53, replace "matrix address order," with -- matrix value order, --.
Line 62, replace "matrix addresses" with -- matrix values --
Line 63, replace "The address" with -- The matrix value --
Line 64, replace "pixel's value" with -- pixel's matrix value --.
Line 66, replace "value is outside" with -- matrix value is outside --
Line 67, replace "that frame." with -- that frame. This method is duplicated for each primary color. The number of frames in a sequence is equal to the number of locations or the number of values in each matrix. --.

UNITED STATES PATENT AND TRADEMARK OFFICE
CERTIFICATE OF CORRECTION

PATENT NO. : 6,034,663
DATED : March 7, 2000
INVENTOR(S) : Carrell R. Killebrew, Jr., Jian Lin, Shin-hua Chang It is certified that error appears in the above-identified patent and that said Letters Patent is hereby corrected as shown below:

Column 6,
Line 2, replace "addresses in ascending" with -- values in ascending --.
Line 2, replace "desired grey" with -- desired gray --.
Line 5, replace "addresses 0-255, the address" with -- values 0-255, the value --.
Line 6, change "The range of values" to -- The ON range --.
Line 8, change "the range of values" to -- extent of the ON range --.
Line 8, replace "grey scale" with -- gray scale --.
Line 10, replace "grey scale" was mistakenly written "gray scale".
Lines 11-16, change "In each frame the current incoming pixel value is used and is offset by the frame number multiplied by the current incoming pixel value. The total number of frames is equal to the grey scale resolution. For example of the 16x16 matrix used herein, there are 256 frames, which may be conveniently referred to as F0-F255."
to -- the starting point of the ON range is generated by multiplying the current incoming pixel's grey scale value with the frame number, then adding an offset. --.
Line 17, equation 1, replace "$Rmin_n = FG + Offset$" with -- $Rmin = [FG + Offset]$ modulo N --
Line 19, equation 2, replace "$Rmax_n = Rminn + (G - 1)$" with -- $Rmax = [Rmin + (G - 1)]$ modulo N --
Lines 20-23, replace "where Rmin is the lower end of the range in modulo N, Rmax is the upper end of the range in modulo N, G is the grey scale value of the incoming pixel, F is the frame number, and N is the desired grey scale resolution." with -- where Rmin is the starting point of the ON range, Rmax is the ending point of the ON range, G is the gray scale value of the incoming pixel, F is the frame number, and N is the desired gray scale resolution. --.
Line 28, "the ON range" was mistakenly written "the range".
Lines 29 and 30, replace "grey scale" with -- gray scale --
Line 29, replace "grey shades." with -- gray shades --
Line 31, replace "the range of" with -- the ON range --
Line 32, replace "values in successive ones of the 256 frames." with -- in successive ones of the 256 frames with zero offset. The 256 frames are conveniently referred to as F0-F255. --.
Line 35, in the header of Table 1, replace "Value Range" with -- ON Range --.
Lines 42-44, please replace "Those of ordinary skill in the art will recognize that the range of values repeats itself every four frames, or sixty four times in every 256 frames." with -- Those of ordinary skill in the art will recognize that any control matrix value between 0 and 255, which is assigned to corresponding pixels of the display, will evenly fall into the ON range 64 times in every 256 frames. --.
Lines 44-46, replace "Thus, each pixel in the control matrix having a gray scale value of 64 will be turned on for one frame out of every four." with -- Thus, each pixel with an incoming gray scale value of 64 will be evenly turned on 64 frames out of 256 frames. --.

UNITED STATES PATENT AND TRADEMARK OFFICE
CERTIFICATE OF CORRECTION

PATENT NO. : 6,034,663
DATED : March 7, 2000
INVENTOR(S) : Carrell R. Killebrew, Jr., Jian Lin, Shin-hua Chang It is certified that error appears in the above-identified patent and that said Letters Patent is hereby corrected as shown below:

Column 6, (cont),
Lines 47-48, replace "Table 2 illustrates the range of values in successive ones of the 256 frames for a pixel value of 254:" with -- Table 2 illustrates the ON range in successive ones of the 256 frames for a pixel with an incoming gray scale value of 254 with zero offset: --.
Line 51, in the header of Table 2, replace "Value Range" with -- ON Range --.
Line 63 to column 7, line 2, replace "In the example of Table 2, those of ordinary skill in the art will recognize that the range of values repeats itself every two hundred and fifty four frames. In general, for any pixel grey shade value "G", the range of "ON" values will repeat itself G times in 256 frames." with -- In general, for a gray scale value "G" in grayscale resolution N, any control matrix value will evenly fall into the ON range G times in a sequence of N frames. Thus, each pixel with an incoming gray scale value G will be turned on G times out of every N frames. --.
Line 64, change "range of values" to -- ON range --.

Column 7,
Line 4, replace "matrix address layout" with -- matrix value layout --
Lines 8, 12 and 17, replace "grey scale" with -- gray scale --.
Lines 10-11, replace "the range of value employs" with -- the ON range employs --.
Line 11, replace "and the grey" with -- and the gray --.
Lines 19 and 44, replace "the range of values" with -- the ON range --.
Lines 21 and 25, replace "matrix address" with -- matrix value --.
Line 22, replace "with the range of values" with -- with the ON range --.
Line 23, replace "If the pixel address is in" with -- If the matrix value of them pixel is in the ON --.
Lines 26 and 36, replace "the range of values in the" with -- the ON range --.
Line 42, replace "blink" with --pulsing--
Line 47, replace "ranges of values at F0 started at address 0." with -- ON range at F0 started at value 0. --.
Line 49, replace "F0 starting addresses for the ranges of with -- F0 starting --.
Line 50, replace "values for the" with -- values for the ON ranges for the --.
Line 52, replace "the range of values for F0" with -- the ON range for F0 --.
Lines 54 and 55, replace "range of values for" with -- ON range for --
Lines 57-58, change "the total address value range of 0-255." to -- the number of matrix elements." --.

UNITED STATES PATENT AND TRADEMARK OFFICE
CERTIFICATE OF CORRECTION

PATENT NO. : 6,034,663
DATED : March 7, 2000
INVENTOR(S) : Carrell R. Killebrew, Jr., Jian Lin, Shin-hua Chang It is certified that error appears in the above-identified patent and that said Letters Patent is hereby corrected as shown below:

Column 8,
Lines 13, 16, 26, 29, 43 and 47, replace "matrix address" with -- matrix value --.
Line 17, replace "address PIX_ADDR" with -- value PIX_VAL --
Line 20, replace "upper and lower bounds of the range of values" with -- starting and ending bounds of the ON range --.
Line 22, replace "grey shade" with -- gray shade --
Line 23, replace "PIX_ADDR" with -- PIX_VAL --
Lines 54-55, replace "CIRCULAR QUEUE" with -- circular queue 34 --
Line 65, replace "PIX_ADDR" with -- PIX_VIAL --.

Column 9,
Lines 1, 3 and 6, replace "PIX_ADDR" with -- PIX_VAL --
Line 4, replace "grey" with -- gray --
Lines 9 and 24, replace "matrix address" with -- matrix value --
Lines 10-11, replace "38 and pixel matrix address" with -- 38 and matrix value --.
Line 13, replace "pixel row value" with -- pixel row address --.
Line 19, replace "address generator" with -- value generator --.
Line 34, replace "the PIX_ADDR will be valid." with -- the PIX VAL will be valid. Persons of ordinary skill in the art will observe that a regular matrix loaded into RAM 48 would allow the entirety of FIG. 5 to be reduced to a decoder controlled solely by PIX COL and PIX ROW. An irregular matrix contains a near random pattern of values with no relationship to PIX COL and PIX ROW. A regular matrix contains values which have a relationship to PIX COL and PIX ROW. --.
Line 49, replace "columns" with -- lines --.

Column 10,
Line 6, replace "counter 52 clocks" with -- counter 56 clocks --.
Lines 29 and 46, replace "grey" with -- gray --
Line 67, replace "PIX_ADDR" with -- PIX_VAL --

UNITED STATES PATENT AND TRADEMARK OFFICE
CERTIFICATE OF CORRECTION

PATENT NO.    : 6,034,663
DATED         : March 7, 2000
INVENTOR(S)   : Carrell R. Killebrew, Jr., Jian Lin, Shin-hua Chang It is certified that error appears in the above-identified patent and that said Letters Patent is hereby corrected as shown below:

<u>Column 11,</u>
Line 2, replace "PIX_ADDR" with -- PIX_VAL --.
Line 5, replace "address" with -- value --.
Lines 8 and 11, replace "valid address ranges" with -- valid ON range --
Line 13, replace "zero," with -- one, --
Line 15, replace "one," with -- zero, --
Line 18, replace "grey" with -- gray --.
Line 19, replace "102 causes 8-bit wide" with -- 102 causes --
Line 21, replace "PANEL DATA. Otherwise," with -- PANEL DATA.
Persons of ordinary skill in the art will recognize that all of the control signals used to drive the circuitry of FIGS. 3 through 10 are readily available, or easily generated. Otherwise, --.

Signed and Sealed this

Twenty-second Day of January, 2002

*Attest:*

*Attesting Officer*

JAMES E. ROGAN
*Director of the United States Patent and Trademark Office*